INVENTOR
WILLIAM L. THOME

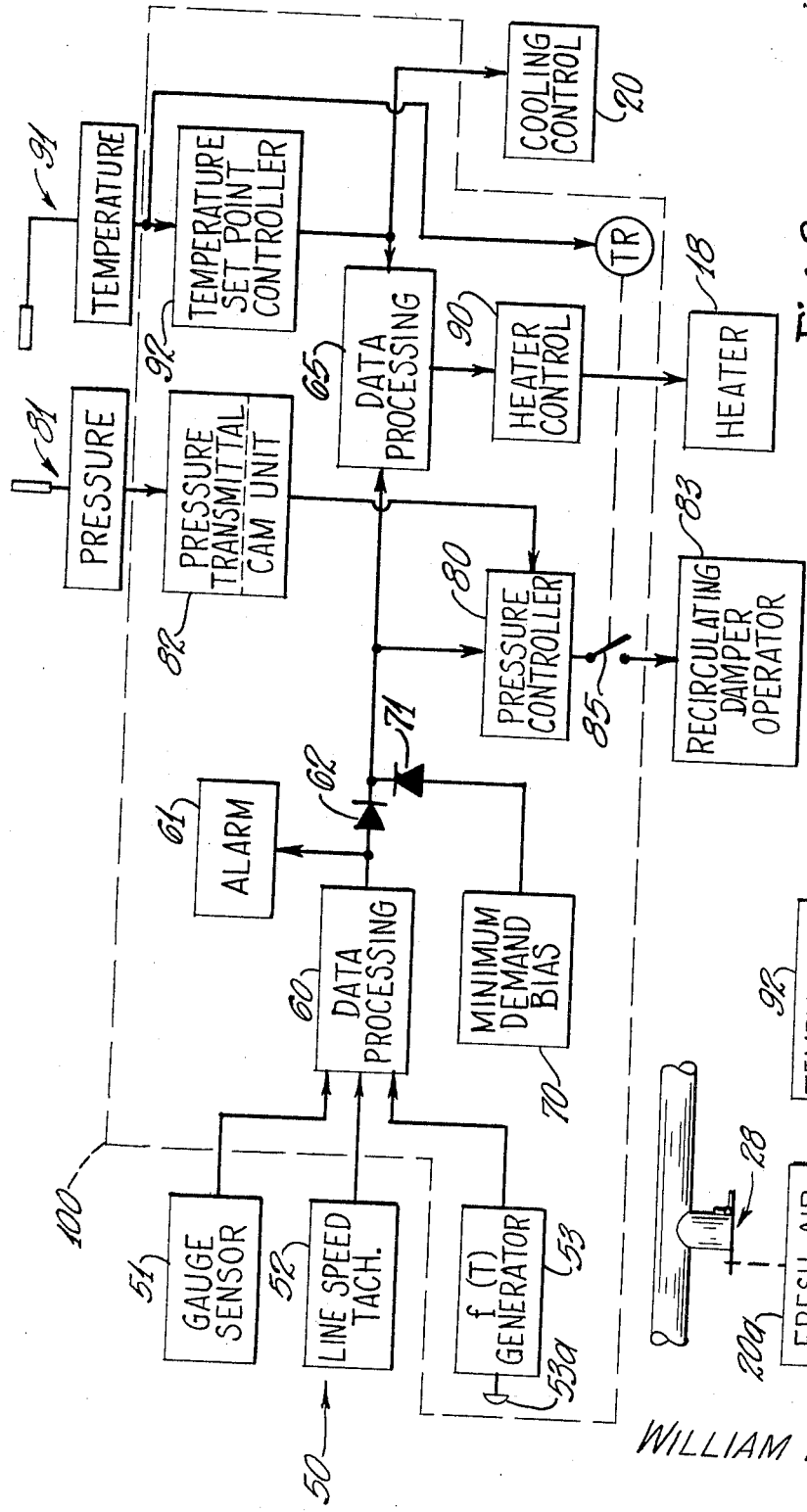

United States Patent Office 3,446,273
Patented May 27, 1969

3,446,273
CONTROL SYSTEM
William Leonard Thome, Toledo, Ohio, assignor to Midland-Ross Corporation, Toledo, Ohio, a corporation of Ohio
Filed Oct. 18, 1967, Ser. No. 676,148
Int. Cl. F25b 29/00
U.S. Cl. 165—26
22 Claims

ABSTRACT OF THE DISCLOSURE

A control system for apparatus which includes a convection heating housing and means for directing gases in heat transfer relationship with the material as it passes through the housing. The gases are heated and circulated between the heating means and the gas directing means. Two controls are exercised over the heating effect. First, the wind pressure in the circulating means is sensed and a signal is supplied proportional to that pressure. A signal is also supplied proportional to the load demand on the heating in the housing. Means responsive to the wind pressure signal and the load demand signal control the flow of gases in the circulating means. Secondly, the temperature of the gases is sensed, compared with a preset temperature value, and a temperature error signal is provided proportional to the difference between the sensed and preset values. Means responsive to the load demand signal and the temperature error signal controls the heating means.

---

In heat treating strip the maximum strip temperature must be controlled quite accurately. One common method is to use a very low thermal head and have an associated low processing rate. With a line stop or with very low production, the strip reaches furnace temperature which is set at the maximum allowable strip temperature. The production rate is limited so that at its maximum, the strip will be heated to within 15 or 20° of the furnace temperature.

Convection heating of metal strip by application thereto of high velocity streams of gas whose temperature is relatively high is referred to as high heat head convection heating of the strip. In such heating very high heating rates are obtained, and the size of equipment required is substantially smaller and, correspondingly, somewhat less expensive. The heating capacity of the strip heater is greatly increased by operating the furnace at a temperature considerably in excess of the maximum allowable strip temperature. Associated with this normally are wide swings in the maximum strip temperature as the production rate changes. The production rate can be compensated for by varying the temperature of the means heating the circulating gases. However, it has been discovered that by varying the heat transfer coefficient that the heating effect in the convection housing can be changed very rapidly, attaining greater production and more uniformity in the treatment.

In this system the heating effect in the strip heating chamber is varied in response to the load demand on the heating chamber. That is, the load demand on the heating chamber varies in accordance with the amount of material passing through the heating chamber and the final temperature which the material is to attain in the chamber. Two controls, which may be utilized separately, but which are advantageously utilized together are disclosed hereinafter.

It is, accordingly, an object of this invention to provide an improved control system for a convection strip heater of the type described herein.

It is another object of this invention to provide an improved control system for apparatus adapted to have material passed therethrough for heating.

It is a still further object of this invention to provide an improved control system for heating apparatus adapted to have material passed therethrough in which the heating effect of the apparatus is controlled by varying the heat transfer coefficient.

The above objects are attained in this invention by the use of apparatus which features a control system for apparatus adapted to have material passed therethrough for heating which includes a convection heating housing through which the material is passed and which has means for directing gases in heat transfer relationship with the material. Means are utilized to heat the gases. The gases are circulated from the heating means to the gas directing means and back to the heating means. The wind pressure in the circulating means is sensed and a signal is supplied proportional thereto. Load demand means supplies a signal proportional to the amount of material passing through the housing and the final temperature the material is to attain in the housing. Means responsive to the wind pressure signal and the load demand signal control the flow of gases in the circulating means. The gas flow controller means may include a pressure controller. The load demand signal provides a set point for the pressure controller while the wind pressure signal provides an error signal to the pressure controller defining the deviation from the set point provided by the load demand signal.

When the material is in strip form the load demand signal may be determined from means for providing a signal proportional to the gauge of the strip, means for providing a signal proportional to the line speed of the strip, and means for generating a signal which is proportional to a function of the temperature of the circulating gases, the initial temperature of the strip and the desired final temperature of the strip. The three signals are arithmetically combined, preferably through a multiplication process, to provide the load demand signal. In order to prevent a "zero" product from the multiplication process in the event that any one of the three signals being fed to the multiplier is zero, a minimum demand signal is generated. Means are further included for selecting the minimum demand signal when the load demand signal drops below a predetermined value.

The gas circulating means may include blower means having drive motor means and conduit means. The control system may also include means responsive to the temperature of the circulating gases for restricting flow in the conduit means when the temperature of the circulating gases is below a predetermined value to prevent overloading of the drive motor means. As an additional safety feature means responsive to the load demand signal may be provided for enabling an alarm means in response to a predetermined variation from a predetermined value of the load demand signal, so that the operator may know when the system is operating outside of a controllable range.

A second control for the system, which is preferably utilized with the first control discussed hereinbefore but which may be applied as an individual control to some systems, includes means for sensing the temperature of the circulating gases, comparing the sensed temperature value with a preset temperature value, and providing a temperature error signal proportional to the difference between the sensed and preset values. Means responsive to the temperature error signal and the load demand signal may be utilized to control the heating means. The load demand and temperature error signals are arithmetically combined, preferably through a multiplication process, to provide the heating control signal. As noted above to prevent a zero heating control signal, a minimum demand signal is supplied along with the means for selecting the minimum demand signal in response to a predetermined low value of the load demand signal. Means for cooling the circulating gases is supplied, the cooling means being responsive to the temperature error signal to prevent overheating during a line idling condition.

Other objects, advantages, and features of this invention will become readily apparent when the following description is taken in conjunction with the accompanying drawings, in which:

FIGURE 2 is a block diagram of control apparatus for the convection heater illustrated in FIGURE 1; and FIGURE 3 illustrates an alternative means for providing cooling for the apparatus of FIGURE 1.

Figure 1:
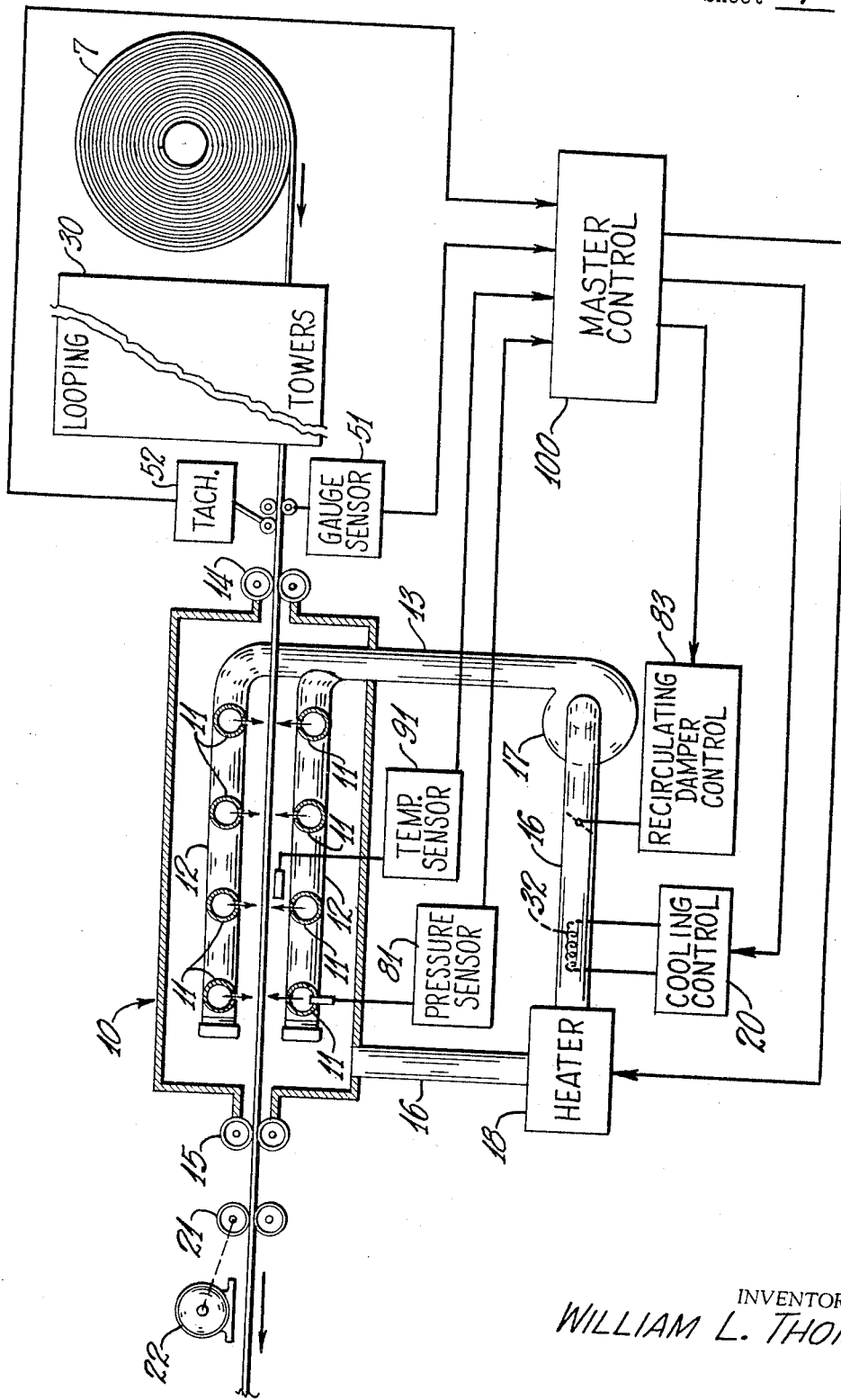
FIGURE 1 is a schematic representation of a convection heater utilizing the teachings of this invention.

The apparatus of FIGURE 1 comprises a convection heating housing 10 forming a part of a closed circuit for a convection heating stream of gas, the gases being directed in heat transfer relationship with the strip passing through the housing 10 via nozzle openings formed in transversely extending nozzle ducts 11 which are fed from manifolds 12. Entrance and exit roll seals 14 and 15 seal the circulating gases and the closed circuit from outside air. The remainder of the closed circuit includes a conduit 13 to supply the gases to the manifolds 12, a return conduit 16, a heating means 18 for the circulating gases, and a blower 17. Strip is drawn through the housing 10 by conveyor or driving roll means 21 operated by a strip drive motor or motor-generator set 22. Except for initial startup the blower 17 may be a constantly operating blower.

Where flue gas forms a suitable atmosphere for the metal to be heated, as may be the case in many copper and aluminum base alloys, the heater 18 may be a direct-fired type of heater, and a vent may be provided for excess atmosphere gas from the direct-fired heater. In some cases, as for example in heating steel strip, an indirect heater will be used and a specially prepared atmosphere gas for circulation will be supplied to the closed circuit by an atmosphere inlet pipe, not shown, and flue gas from a heater would be vented. In still other instances the heater may be an electrically driven heater wherein electric heating elements are suspended in the path of the circulating gases to provide heat thereto. The teachings of this invention are applicable to any of the above types of heaters or other heaters suitable for use therein.

Looping towers are illustrated in block form at 30 and provide a storage space for the strip material whenever a coil 7 of the strip material is used up and a splicing operation for the successive coil 7 is being performed.

Strip heating effected by the apparatus illustrated in FIGURE 1 may be calculated by the following equation:

$$\ln\left[\frac{T_F - T_{S_1}}{T_F - T_{S_2}}\right] = \frac{h_t A}{W C_p} \quad (1)$$

This can be rewritten:

$$\ln\left[\frac{T_F - T_{S_1}}{T_F - T_{S_2}}\right] = \frac{K_1 h_{r_{BB}} + K_2 \left[p^{.35}\left(\frac{T_F + 460}{520}\right)^{.13}\right]}{(GA)(L.S.)} \quad (2)$$

or:

$$(GA)(L.S.) = \frac{K_1 h_{r_{BB}} + K_2 \left[p^{.35}\left(\frac{T_F - 460}{520}\right)^{.13}\right]}{\ln\left[\frac{T_F - T_{S_1}}{T_F - T_{S_2}}\right]} \quad (3)$$

List of symbols where:

$T_F$ = Furnace temperature
$T_{S_1}$ = initial strip temperature
$T_{S_2}$ = final strip temperature $h_t$ = total heat transfer coefficient
A = heat transfer area
W = strip production
$C_p$ = strip specific heat
P = nozzle pressure
GA = strip gauge
L.S. = strip line speed
$h_{r_{BB}}$ = black body radiation coefficient
$K_1$ = constant
$K_2$ = constant If all of the temperatures in the above equations are assumed to be constant then there is a value of nozzle pressure P for each value of the product of (GA)(L.S.). Under normal operating conditions the temperatures may be assumed to be constant since the furnace temperature $T_F$ is operating within a relatively constant range, the initial strip temperature $T_{S_1}$ is known since the coils 7 of the strip material are stored under relatively constant temperature conditions, and the final strip temperature $T_{S_2}$ that is desired is known. Thus this equation can be solved with cams, using a different cam for each set of temperature conditions. In practice, this would mean one cam for each desired metal temperature. This concept will give an exact mathematical solution to the problem.

While the above system should be the best functionally, it does have the disadvantage of requiring a separate cam for each set of temperature and possible errors resulting therefrom. All of the temperature related functions can be combined into one number $f(T_F, T_{S_2}, T_{S_1})$, only dependent upon temperatures. Then an approximation to Equation 2 is given by:

$$(GA)(L.S.)[f(T_F, T_{S_2}, T_{S_1})] = P^{.35} \quad (4)$$

Equipment to solve Equation 4 would require only one cam for all conditions of temperatures. The function, $f(T_F, T_{S_2}, T_{S_1})$, may be read by the operator from a table. This value of temperature function may then be electrically multiplied times the gauge and line speed to give a load demand signal. Mathematically the approximate solution as given by Equation 4 has a very slight error, since the values represented by $K_1 h_{r_{BB}}$ gives a value for the right hand side of Equation 3 even when the nozzle pressure P is zero. However, a plot of the curve resulting from Equation 3 and Equation 4 wherein values of P are the abscissa and values of (GA)(L.S.) are the ordinate shows that within the operating ranges desired the difference between the curves resulting from Equation 3 and Equation 4 are very, very small.

Equation 4 may be solved electrically without the use of a cam by taking logs. Then:

$$\text{Log } (GA) + \log (L.S.) + \log [f(T_F, T_{S_2}, T_{S_1})]$$
$$= 0.35 \log P \quad (5)$$

or:

$$\text{Log}\left[(GA)(L.S.)\left[f(T_F, T_{S_2}, T_{S_1})\right]\right] = 0.35 \log P \quad (6)$$

The invention disclosed herein includes within its scope the control by cam or electrical solution of the above equations.

Referring to FIGURE 2 there is illustrated in block diagram form a control system for the apparatus of FIGURE 1. The master control as indicated at 100 in FIGURE 1 is enclosed within dashed lines.

A load demand signal, that is, a signal which is the measure of the heating demand required for desired conditions within the housing 10, is supplied by load demand means indicated generally at 50. As noted from the above Equation 4 the load demand signal may be derived from three conditions. A gauge sensor 51, provides a voltage or signal output which represents the gauge condition of the strip being fed to the housing 10. Although there are several commercially available devices for accomplishing this, a gauge deviation and power unit may be utilized which measures the gauge deviation from a nominal set point. A signal derived from this measurement may be amplified and added to the nominal gauge by a proportional amplifier to provide the output from unit 51.

The line speed condition may be obtained from a line speed sensor 52 which may be a tachometer attached to an idler roll disposed adjacent the line. The output from the tachometer may be amplified by a proportional amplifier and provide a voltage or signal output representative of line speed.

The temperature function generator 53 may be an electrical circuit including a potentiometer calibrated from zero to one hundred. The potentiometer may be adjusted via adjustment means 53a to provide an output proportional to each condition of desired strip temperature, initial strip temperature, and actual heating zone temperature. Previously accomplished calculations may be set forth on a chart showing the required setting according to the calibration on the potentiometer for the various alloys or strip material being treated.

A data processing or computer element 60 arithmetically combines the three inputs from the gauge sensor, line speed sensor, and temperature function generator to provide an output which is representative of the load demand. The data processing unit 60 may be apparatus for electrically multiplying together the gauge, line speed and temperature function signals, the result being the left hand side of the Equation 4 above. The output of the computer element 60 is advantageously monitored by an alarm unit 61 to warn the operator visually and/or audibly that the output of the data processing unit 60 is above or below the controllable range of the equipment.

Since the three values from units 51, 52 and 53 are advantageously multiplied by the data processing unit 60, a zero output for any one of the units will result in a zero output from the unit 60. In order to establish a minimum signal or a minimum demand or requirement for the apparatus of FIGURE 1, a minimum demand bias circuit 70 is included. The minimum demand bias circuit may be a voltage source having a tapped and adjustable resistor included in series therewith to provide a bias signal, the desired level or magnitude being obtained by adjusting the tap on the resistor.

The rectifiers 62 and 71 provide a means for selecting the minimum demand signal when the load demand signal drops below a predetermined value. That is, when the output from the multiplier or data processing unit 60 drops below a predetermined value which is less than that supplied by the bias circuit 70, the signal from the bias circuit 70 will block flow from the rectifier 62 and will be supplied for later use in the master control 100. Alternatively, when the load demand signal from unit 60 exceeds the magnitude of the bias signal from unit 70, the output from the bias unit 70 is blocked at rectifier 71 so that only the load demand signal is utilized in the remainder of the master control circuit 100.

A pressure sensing unit 81 provides a measure of the wind or gas pressure in the transverse nozzle ducts 11. A pressure transmitter 82 receives the sensed pressure and provides an output which is proportional to the pressure within the nozzle ducts 1. The pressure transmitter 82 includes a cam unit which extracts the 0.35 power required by the right hand side of the Equation 4 above.

A pressure controller unit 80 receives the load demand signal from the computer or data processing unit 60 and utilizes this signal as its set point. The signal from the pressure transmitter and cam unit 82 is compared to this set or control point. Mathematically the controller 80 compares the left and right hand sides of the Equation 4. The output of pressure controller 80 positions the furnace recirculating damper via recirculating damper control 83 which includes an electropneumatic converter and a damper operator. A relay TR which is responsive to the temperature sensed by temperature sensor 91 operates a contact or switch 85 to keep the recirculating damper closed at low temperatures to prevent overloading of the fan motor.

During normal operation, line speed is reduced for coil changes, for example when processing 0.010 gauge, the line speed may be cut in half. The required heat input to the housing 10 then becomes about half. This required load demand is reflected by the fact that the output of the line speed sensor 52 will be cut in half, thus halving the product of the multiplication in the data processing unit 60. The set point for the pressure controller 80 then becomes half and the recirculating damper control 83 operates via the air signal provided by the pressure transmitter and cam unit 82 to reduce the pressure of the recirculating gases by one-half to achieve the desired control during splicing. Since such control is almost instantaneous the response of the before described control system is more rapid than any system known heretofore in the art, thus improving the efficiency of operation and the uniformity of the treatment.

With the almost instantaneous change is load as noted above, there may be some temporary drift in the furnace temperature without auxiliary controls. If auxiliary controls are not utilized a temperature sensing unit 91 provides a signal to a temperature set point controller 92 which is compared with the set point temperature in the controller. A deviation between the sensed and preset values normally would be provided from the temperature set point controller 92 to the heater control 90. If the heater 18 includes electrically driven elements, then the heater control 90 may include saturable core reactors which are responsive to the output from the temperature set point controller 92 to control the amount of electrical energy delivered through the saturable core reactors to the heating elements in the heater 18. If another type of heater is substituted, suitable heater control devices which are responsive to temperature set controllers may be connected to the heater in accordance with the teachings of the prior art.

In order to provide a vernier control to avoid the temporary drift in furnace temperature that might occur, a data processing unit 65 may be used to supply a temperature demand control signal to the heater control 90. The data processing unit 65 arithmetically combines the load demand signal from unit 60 and the temperature set point control output, preferably by multiplication. Thus, if the line speed for example should suddenly be cut in half, the furnace load demand becomes halved and the output of the temperature signal demand computer or data processing unit 65 becomes halved. Therefore, during a sudden shift in furnace load, the output from the temperature set point controller 92 remain essentially constant. The temperature controller 92 will therefore stay in approximate balance and can provide any slight vernier adjustments as required. Changes in heat demand resulting in changes from strip width or general temperature level may be provided by the temperature set point controller 92.

The output of the temperature set point controller 92 may advantageously be applied to operate a cooling control 20. This functions to provide cooling during line idling conditions so as not to overheat the furnace by fan heat.

The cooling means may take a variety of forms depending upon the requirements of the particular strip being heated. For example the cooling means may take the forms of a fresh air inlet damper 28, as illustrated in FIGURE 3, when the metal strip being heated is not damaged thereby, as in heating aluminum strip. The fresh air damper 28 is controlled by a fresh air damper operator which may include an electropneumatic converter responsive to the output of the temperature set point controller 92 and a damper operator. The cooling means may take the form of a stream or water jet for some strips such as copper base alloys that are not harmed thereby. For other strip materials it may be an indirect cooler such as an indirect water-cooled heat exchanger 32 as shown in FIGURE 1 which may be constantly cooled to avoid overheating the heat exchanger. The amount of cooling performed by the heat exchanger 32 is subject to the cooling control 20 which is responsive to the output of the temperature set point controller 92.

Under experimental conditions apparatus embodying the features of the invention described herein has operated satisfactorily with strip gauges from 0.010″ to 0.064″ and line speeds of 20 feet per minute to 160 feet per minute. By automatically adjusting nozzle wind pressure to maintain constant strip temperature with variations in line speed and strip gauge, the system has several advantages. On continuous lines, the line speed can be reduced by factors of two or three to one during splicing. This permits the use of considerably smaller looping towers which represent very large savings. The control as described herein compensates for gauge and line speed variations which permits the use of a higher thermal head and allows greater production from a given furnace. The response of the system is very rapid enabling a higher efficiency and a greater uniformity. It should be noted that the value of pressure P may deviate slightly from the 0.35 power, depending upon the design of the system. However, the value of P used illustrates the teachings of this invention.

In conclusion it is to be noted that the embodiments disclosed and described herein are meant to be illustrative only and not limiting in any sense. The embodiments described serve merely to illustrate the spirit and scope of the invention.

I claim:

1. A heat transfer control system for apparatus adapted to have material passed therethrough for heating which comprises the combination of a convection heating housing through which said material is passed which includes means for directing gases in heat transfer relationship with said material; means for heating said gases; means for circulating said gases from said heating means to said gas directing means and back and said heating means; means for sensing the wind pressure in said circulating means and supplying a signal proportional thereto; load demand means for supplying a signal proportional to the amount of material passing through said housing and the final temperature said material is to attain in said housing; and means responsive to said wind pressure signal and said load demand signal for controlling the flow of gases in said circulating means.

2. A system as defined in claim 1 in which said gas flow controlling means includes a pressure controller, said load demand signal providing a set point for said pressure controller, said wind pressure signal providing an error signal to said pressure controller defining the deviation from the set point provided by said load demand signal.

3. A system as defined in claim 1 in which said material is in strip form and in which said load demand means includes means for providing a signal proportional to the gauge of said strip.

4. A system as defined in claim 1 in which said material is in strip form and in which said load demand means includes means for providing a signal proportional to the line speed of said strip.

5. A system as defined in claim 1 in which said material is in strip form and in which said load demand means includes means for generating a signal which is proportional to a function of the temperature of the circulating gases, the initial temperature of the strip, and the desired final temperature of the strip.

6. A system as defined in claim 3 in which said load demand means further includes means for providing a signal proportional to the line speed of said strip means for generating a signal which is proportional to a function of the temperature of the circulating gases, the initial temperature of the strip, and the desired final temperature of the strip; and means for arithmetically combining said gauge, line speed and temperature function signals to provide said load demand signal.

7. A system as defined in claim 6 in which said arithmetic means multiplies said gauge, line speed and temperature function signals.

8. A system as defined in claim 1 which further includes means for generating a minimum demand signal and means for selecting said minimum demand signal when said load demand signal drops below a predetermined value.

9. A system as defined in claim 1 in which said gas circulating means includes blower means having drive motor means and conduit means; and which further includes means responsive to the temperature of said circulating gases for restricting flow in said conduit means when the temperature of said circulating gases is below a predetermined value to prevent overloading of said drive motor means.

10. A system as defined in claim 1 which further includes means responsive to said load demand signal for enabling an alarm means in response to a predetermined variation from a predetermined value of said load demand signal.

11. A control system as defined in claim 1 which further includes means for sensing the temperature of said circulating gases, comparing said sensed temperature value with a preset temperature value, and providing a temperature error signal proportional to the difference between said sensed and preset values; and means responsive to said temperature error signal and said load demand signal for controlling said heating means.

12. A control system as defined in claim 11 in which said heating control means includes means for arithmetically combining said load demand and temperature error signals to provide a heating control signal.

13. A system as defined in claim 11 in which said arithmetic means multiplies said load demand and temperature error signals.

14. A control system as defined in claim 11 which further includes means for generating a minimum demand signal and means for selecting said minimum demand signal in response to a predetermined low value of said load demand signal.

15. A control system as defined in claim 11 which further includes means for cooling said circulating gases, said cooling means being responsive to said temperature error signal to prevent overheating during a line idling condition.

16. A control system for apparatus adapted to have material passed therethrough for heating which comprises the combination of a convection heating housing through which said material is passed which includes means for directing gases in heat transfer relationship with said material; means for heating said gases; means for sensing the temperature of said gases, comparing said sensed temperature value with a preset temperature value, and providing a temperature error signal proportional to the difference between said sensed and preset values; load demand means for supplying a signal proportional to the amount of material passing through said housing and the final temperature said material is to attain in said housing; and means responsive to said load demand signal and said gas temperature signal for controlling said heating means.

17. A system as defined in claim 16 in which said material is in strip form and in which said load demand means includes means for providing a signal proportional to the gauge of said strip.

18. A system as defined in claim 16 in which said material is in strip form and in which said load demand means includes means for providing a signal proportional to the line speed of said strip.

19. A system as defined in claim 16 in which said material is in strip form and in which said load demand means includes means for generating a signal which is proportional to a function of the temperature of the gases, the initial temperature of the strip and the desired final temperature of the strip.

20. A system as defined in claim 16 in which said load demand means further includes means for providing a signal proportional to the line speed of said strip; means for generating a signal which is proportional to a function of the temperature of the gases, the initial temperature of the strip and the desired final temperature of the strip; and means for arithmetically combining said gauge, line speed and temperature function signals to provide said load demand signal.

21. A system as defined in claim 16 which further includes means for generating a minimum demand signal and means for selecting said minimum demand signal when said load demand signal drops below a predetermined value.

22. A system as defined in claim 16 which further includes means for cooling said gases, said cooling means being responsive to said temperature error signal to prevent overheating during a line idling condition.

References Cited

UNITED STATES PATENTS

| | | | |
|---|---|---|---|
| 2,518,905 | 8/1950 | Kniveton | 236—15 |
| 2,540,966 | 2/1951 | Swain | 236—15 |
| 3,355,156 | 11/1967 | Hanna | 236—15 |

ROBERT A. O'LEARY, *Primary Examiner.*

CHARLES SUKALO, *Assistant Examiner.*

U.S. Cl. X.R.

165—120, 134; 236—15